(12) United States Patent
Ellis et al.

(10) Patent No.: US 11,440,440 B2
(45) Date of Patent: Sep. 13, 2022

(54) MODULAR AUTONOMOUS-VEHICLE INTERIOR

(71) Applicant: UATC, LLC, San Francisco, CA (US)

(72) Inventors: Johad Husseini Ellis, Pittsburgh, PA (US); Clifford Shaun Webb, Pittsburgh, PA (US)

(73) Assignee: UATC, LLC, Mountain View, CA (US)

( * ) Notice: Subject to any disclaimer, the term of this patent is extended or adjusted under 35 U.S.C. 154(b) by 802 days.

(21) Appl. No.: 16/174,636

(22) Filed: Oct. 30, 2018

(65) Prior Publication Data

US 2020/0047643 A1 Feb. 13, 2020

Related U.S. Application Data

(60) Provisional application No. 62/748,743, filed on Oct. 22, 2018, provisional application No. 62/716,047, filed on Aug. 8, 2018.

(51) Int. Cl.
*B60N 2/00* (2006.01)
*B60N 2/02* (2006.01)
*A61G 3/08* (2006.01)

(52) U.S. Cl.
CPC ......... *B60N 2/0292* (2013.01); *A61G 3/0808* (2013.01)

(58) Field of Classification Search
CPC ............... B60N 2/0292; B60N 2/0158; B60N 2/01516; B62D 47/003; B60P 3/36
USPC ..... 297/257; 248/503, 503.1; 296/64, 65.03, 296/65.04
See application file for complete search history.

(56) References Cited

U.S. PATENT DOCUMENTS

| | | | |
|---|---|---|---|
| 1,758,826 A | 5/1930 | Dellert | |
| 1,911,224 A | 5/1933 | Dellert | |
| 2,132,279 A | 10/1938 | Wicknick et al. | |
| 2,563,347 A | 8/1951 | Long | |
| 2,642,119 A | 6/1953 | Dary | |
| 3,463,539 A | 8/1969 | Racine et al. | |
| 3,632,161 A | 1/1972 | Arfaras et al. | |
| 3,637,253 A | 1/1972 | Maule et al. | |
| 4,966,392 A * | 10/1990 | Featon ............... | A61G 3/0808 297/DIG. 4 |
| 4,971,379 A * | 11/1990 | Rumpel ............ | B60N 2/01583 248/503.1 |
| 5,653,262 A | 8/1997 | Hanemaayer | |
| 5,738,408 A | 4/1998 | Wu | |
| 6,030,037 A | 2/2000 | Ritch et al. | |

(Continued)

FOREIGN PATENT DOCUMENTS

| | | |
|---|---|---|
| CN | 203623483 | 6/2014 |
| CN | 105189313 | 12/2015 |

(Continued)

*Primary Examiner* — Stephen T Gordon
(74) *Attorney, Agent, or Firm* — Dority & Manning, P.A.

(57) ABSTRACT

The present disclosure is directed to a modular autonomous-vehicle interior. In particular, an autonomous vehicle can comprise an interior comprising a plurality of different and distinct regions. Each of the regions can comprise one or more mechanical interfaces associated therewith. The autonomous vehicle can also include, for each of one or more of the regions, at least one modular interior unit comprising an interior element and a base mechanically interfaced with the interior via the mechanical interface(s) associated with the region.

20 Claims, 13 Drawing Sheets

(56) References Cited

U.S. PATENT DOCUMENTS

| | | | |
|---|---|---|---|
| 6,264,261 B1 | 7/2001 | Krafcik | |
| 6,338,518 B1 | 1/2002 | D'Annunzio et al. | |
| 6,350,972 B1 | 2/2002 | Wright et al. | |
| 6,540,279 B1 | 3/2003 | Bargiel | |
| 6,925,679 B2 | 8/2005 | Wallach et al. | |
| 7,066,519 B2 | 6/2006 | Rhodes et al. | |
| 7,090,274 B1 | 8/2006 | Khan et al. | |
| 7,156,442 B2 | 1/2007 | McManus et al. | |
| 8,010,230 B2 | 8/2011 | Zini et al. | |
| 8,182,016 B2 | 5/2012 | Kaip et al. | |
| 8,186,735 B2 | 5/2012 | Maceri et al. | |
| 9,256,852 B1 | 2/2016 | Myllymaki | |
| 9,510,682 B2 | 12/2016 | Hasegawa et al. | |
| 9,533,625 B2 | 1/2017 | Krishnan et al. | |
| 11,104,261 B2* | 8/2021 | Westfall | F16B 21/09 |
| 2005/0028543 A1 | 2/2005 | Whitehead et al. | |
| 2007/0156540 A1 | 7/2007 | Koren et al. | |
| 2008/0185893 A1 | 8/2008 | Behrens et al. | |
| 2010/0038483 A1* | 2/2010 | Yamasaki | B64D 11/0696 248/503.1 |
| 2010/0052374 A1 | 3/2010 | Bell et al. | |
| 2015/0006005 A1 | 1/2015 | Yu et al. | |
| 2015/0379468 A1 | 12/2015 | Danaher | |
| 2016/0280095 A1 | 9/2016 | Frye et al. | |
| 2017/0354996 A1 | 2/2017 | Lim et al. | |
| 2017/0166173 A1 | 6/2017 | Lauffer et al. | |
| 2017/0361802 A1* | 12/2017 | Farooq | B60R 21/214 |
| 2018/0079278 A1 | 3/2018 | Kirpichnikov et al. | |
| 2018/0312082 A1* | 11/2018 | Lalague | B60N 2/91 |

FOREIGN PATENT DOCUMENTS

| | | |
|---|---|---|
| DE | 4200476 | 7/1993 |
| DE | 19822694 | 11/1999 |
| DE | 102010055365 | 7/2011 |
| EP | 1247473 | 10/2002 |
| EP | 2258579 | 8/2010 |
| FR | 2920011 | 2/2009 |
| JP | 6270307 | 12/2013 |
| JP | 6262937 | 1/2014 |
| KR | 100783510 | 6/2007 |
| WO | WO2012060462 | 5/2012 |
| WO | WO2017156586 | 9/2017 |

* cited by examiner

MODULAR AUTONOMOUS-VEHICLE INTERIOR

PRIORITY CLAIM

This application claims priority to: U.S. Patent Application Ser. No. 62/716,047, filed Aug. 8, 2018, and entitled "VEHICLE HARDWARE, SYSTEMS, AND METHODS"; and U.S. Patent Application Ser. No. 62/748,743, filed Oct. 22, 2018, and entitled "MODULAR AUTONOMOUS-VEHICLE INTERIOR"; the disclosures of each of which are incorporated by reference herein in their entirety.

FIELD

The present disclosure relates generally to autonomous vehicles. More particularly, the present disclosure relates to a modular autonomous-vehicle interior.

BACKGROUND

An autonomous vehicle is a vehicle that is capable of sensing its environment and navigating with minimal or no human input. In particular, an autonomous vehicle can observe its surrounding environment using a variety of sensors and identify an appropriate path through such surrounding environment.

SUMMARY

Aspects and advantages of embodiments of the present disclosure will be set forth in part in the following description, or can be learned from the description, or can be learned through practice of the embodiments.

One example aspect of the present disclosure is directed to an autonomous vehicle. The autonomous vehicle can comprise an interior comprising a plurality of different and distinct regions. Each of the regions can comprise one or more mechanical interfaces associated therewith. The autonomous vehicle can also include, for each of one or more of the regions, at least one modular interior unit comprising an interior element and a base mechanically interfaced with the interior via the mechanical interface(s) associated with the region.

Another example aspect of the present disclosure is directed to an autonomous-vehicle interior. The interior can comprise a plurality of evenly spaced rows. Each of the rows can comprise a common number of multiple evenly spaced different and distinct regions. Each of the regions can be defined at least in part by a particular shape. The interior can also comprise, for each region of the multiple evenly spaced different and distinct regions, one or more mechanical interfaces configured to mechanically interface with one or more bases of one or more modular interior units. Each of the base(s) can be defined at least in part by the particular shape.

A further example aspect of the present disclosure is directed to an autonomous-vehicle interior. The interior can comprise a plurality of different and distinct regions. Each of the regions can be defined at least in part by a particular shape. The interior can also comprise, for each of the regions, one or more mechanical interfaces configured to mechanically interface with one or more bases of one or more modular interior units. Each of the modular interior unit(s) can comprise a seat, a table, and/or a privacy partition. Each of the base(s) can be defined at least in part by the particular shape.

A further example aspect of the present disclosure is directed to a modular autonomous-vehicle-interior unit. The unit can comprise an interior element of an autonomous vehicle. The unit can also comprise a base. The base can be mechanically interfaced with the interior element. The base can be defined at least in part by a particular shape. The base can be configured to mechanically interface with one or more of a plurality of different and distinct regions of an interior of the autonomous vehicle. Each of the regions can be defined at least in part by the particular shape.

A further example aspect of the present disclosure is directed to a base for a modular autonomous-vehicle-interior unit. The base can comprise a portion configured to mechanically interface with an interior element of an autonomous vehicle. The base can be defined at least in part by a particular shape. The base can be configured to mechanically interface with one or more of a plurality of different and distinct regions of an interior of the autonomous vehicle. Each of the regions can be defined at least in part by the particular shape.

A further example aspect of the present disclosure is directed to an autonomous vehicle. The autonomous vehicle can comprise a plurality of different and distinct regions. Each of the regions can be defined at least in part by a particular shape. The autonomous vehicle can also comprise at least one modular interior unit. The unit can comprise an interior element and a base defined at least in part by the particular shape and mechanically interfaced with one or more of the regions of the interior.

The autonomous vehicle technology described herein can help improve the safety of passengers of an autonomous vehicle, improve the safety of the surroundings of the autonomous vehicle, improve the experience of the rider and/or operator of the autonomous vehicle, as well as provide other improvements as described herein. Moreover, the autonomous vehicle technology of the present disclosure can help improve the ability of an autonomous vehicle to effectively provide vehicle services to others and support the various members of the community in which the autonomous vehicle is operating, including persons with reduced mobility and/or persons that are underserved by other transportation options. Additionally, the autonomous vehicle of the present disclosure may reduce traffic congestion in communities as well as provide alternate forms of transportation that may provide environmental benefits.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which refers to the appended figures, in which.

DETAILED DESCRIPTION

Figure 1:
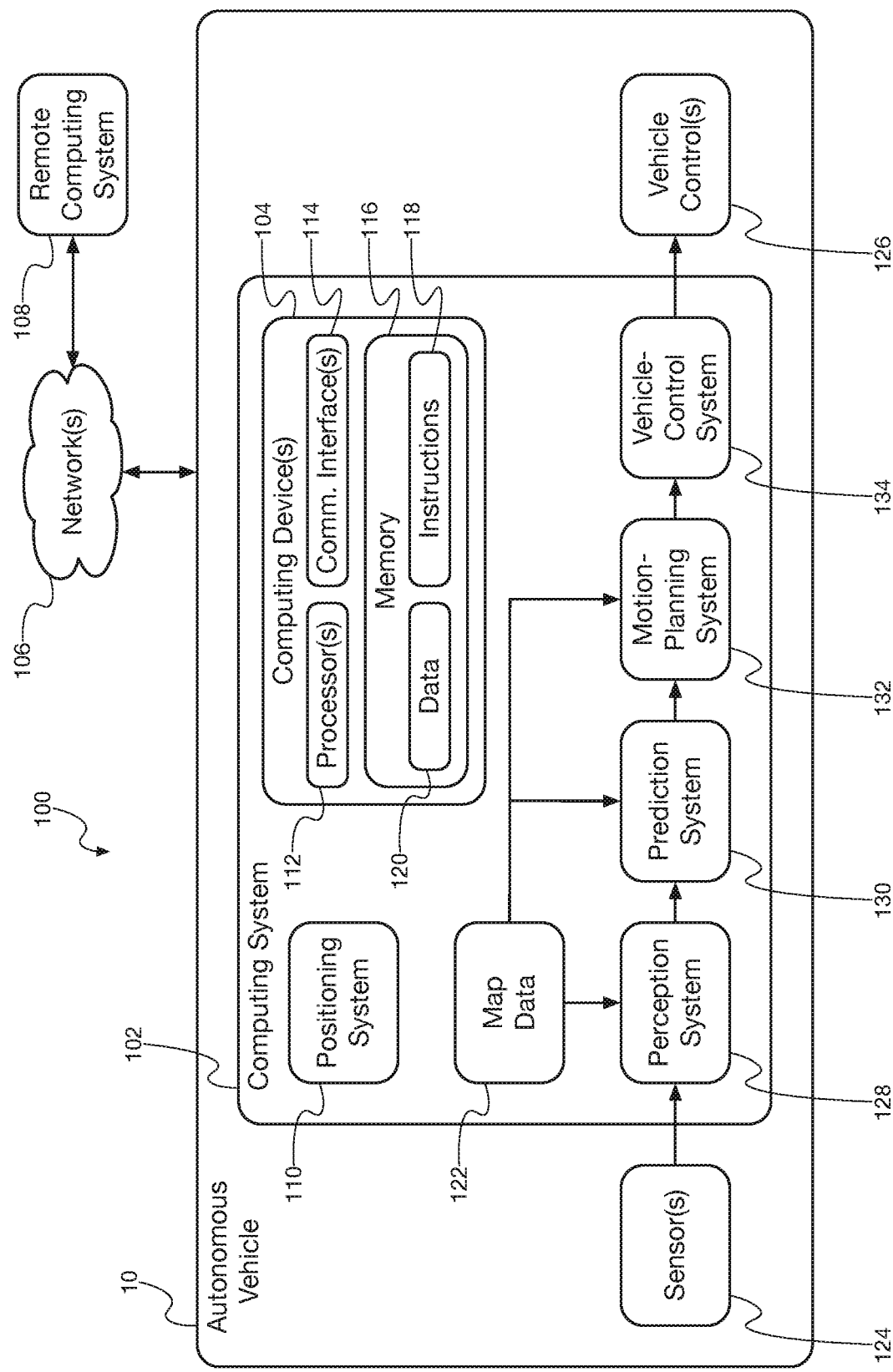
FIG. 1 depicts an example autonomous vehicle according to example embodiments of the present disclosure.

Example aspects of the present disclosure are directed to modular autonomous-vehicle-interior units. In particular, an autonomous vehicle can include an interior comprising multiple different and distinct regions (e.g., portions, sections, and/or the like). For example, the autonomous vehicle can include one or more means for defining such an interior, such as one or more materials (e.g., plastics, metals, composites, fabrics, and/or the like) molded, shaped, extruded, configured, interconnected, and/or the like to form the interior. Each of such interior regions can include one or more mechanical interfaces associated therewith.

For one or more of the interior regions, the interior can include one or more modular interior units. Such unit(s) can include one or more interior elements and one or more bases. For example, the unit(s) can include one or more means for defining such interior element(s) and/or base(s), such as one or more materials (e.g., plastics, metals, composites, fabrics, and/or the like) molded, shaped, extruded, configured, interconnected, and/or the like to form the interior element(s) and/or base(s). The interior element(s) can include, for example, one or more seats, tables, privacy partitions, hardware for securing one or more wheelchairs to the interior, and/or the like. The base(s) can mechanically interface with the mechanical interface(s) of the interior region(s) (e.g., thereby securing the interior element(s) to the interior, and/or the like).

In some embodiments, the interior regions can share, have, be defined in accordance with, and/or the like a common specification. For example, each of the interior regions can share common dimensions (e.g., be of the same dimensions, and/or the like) with each of the other interior regions. Similarly, each of the interior regions (e.g., their largest respective interior-facing surface area, and/or the like) can be defined at least in part by a particular shape (e.g., rectangle, square, circle, oval, and/or the like) that defines at least in part each of the other interior regions. In some of such embodiments, each of the base(s) can be defined at least in part by such particular shape (e.g., a surface area of each base configured to interface with an interior region can be of the same shape as an interior-facing surface area of such interior region configured to interface with the surface area of the base, and/or the like). In some embodiments, each of the interior regions can be evenly spaced within the interior from its respective adjacent interior regions (e.g., in an aligned or offset grid pattern, and/or the like).

In some embodiments, the interior regions can be arranged in a plurality of different and distinct rows. For example, in some embodiments, such rows can be evenly spaced. In some embodiments, each of multiple of such rows can include a common number of the interior regions (e.g., each of the rows can include the same number of interior regions, and/or the like). In some of such embodiments, for each of such rows, the common number of the interior regions can align with the common number of the interior regions included in one or more of such rows that are adjacent to the row (e.g., in an aligned grid pattern, and/or the like).

In some embodiments, the plurality of rows can include one or more other rows. Each of such other row(s) can include a common number of the interior regions (e.g., the same number of the interior regions per row, and/or the like), which can be a different number of interior regions from the common number of the interior regions included in the previously described multiple rows. In some embodiments, each of such other row(s) can be adjacent to one or more of the previously described multiple rows. In some of such embodiments, for each of such other row(s), the common number of the interior regions included in the row can be offset in alignment from the common number of the interior regions included in its adjacent row(s) (e.g., in an offset grid pattern, and/or the like).

As previously indicated, for each of the interior region(s) for which the interior includes the modular interior unit(s), a base of a unit can mechanically interface with the interior via the mechanical interface(s) associated with the interior region. In some embodiments, such interfacing can be in response to a perimeter of the base engaging a perimeter of the interior region (e.g., a base and interior region of the same shape being aligned, brought into contact with one another, and/or the like). For example, the interior can be configured such that an interior-facing surface area of the interior region (e.g., within the perimeter, and/or the like) is fixed flush with a surface of the interior (e.g., the floorboard, and/or the like) until a base of a unit is brought into alignment, contact, and/or the like with its perimeter, for example, thereby enabling the interior region to serve as an interior surface when not interfaced with a base of a unit (e.g., support the weight of a standing passenger when the interior is configured such that the interior region does not include a unit, and/or the like), but also adjust to accommodate the base of a unit such that it can mechanically interface with the interior (e.g., when the interior is configured such that the interior region includes such unit, and/or the like).

In some embodiments, a device comprising specialized tooling can be required to decouple a base of a unit from the interior (e.g., to mitigate the possibility of unauthorized removal, and/or the like). For example, the interior region(s) (e.g., one or more of their associated mechanical interface(s), and/or the like) can be configured to interface with such device. Additionally or alternatively, the unit (e.g., the base, and/or the like) can be configured to interface with such device.

In some embodiments, one or more of the modular interior units can include multiple bases. For example, such unit(s) can be configured to interface with multiple interior regions. In some of such embodiments, one or more of such unit(s) can be configured to span (e.g., extend across, and/or the like) one or more of the interior regions that are not mechanically interfaced with one or more bases of the unit(s). For example, such a unit could utilize the space of three interior regions and include two bases, located on opposite sides of the unit and mechanically interfaced with corresponding interior regions that are evenly spaced from an interior region located between the interior regions with which the unit is mechanically interfaced.

In some embodiments, one or more of the modular interior units can include multiple physically distinct portions. For example, one of such portions can include a portion of the interior element for the unit, and another of such portions can include a different and distinct portion of the interior element for the unit (e.g., such portions can be assembled with one another and/or one or more additional portions into a unit, subsequently disassembled back into different and distinct portions, and/or the like). Additionally or alternatively, one of such portions can include a portion of a base for the unit, and another of such portions can include a different and distinct portion of the base for the unit.

The technology described herein can provide a number of technical effects and benefits. For example, the interiors and modular interior units described herein can enable an autonomous vehicle to be reconfigured to produce various layouts (e.g., via the inclusion of various different modular interior units, and/or the like), which may be particularly advantageous in the context of a fleet of autonomous vehicles serving varying demands, customers, markets, and/or the like. Moreover, the interiors and modular interior units described herein can allow manufacture, operation, and/or the like of a fleet of autonomous vehicles of one or more models that can be utilized, reconfigured, and/or the like for different purposes, thereby reducing costs, simplifying management, supporting more adept services, and/or the like.

With reference now to the figures, example embodiments of the present disclosure will be discussed in further detail.

FIG. 1 depicts an example autonomous vehicle according to example embodiments of the present disclosure.

Referring to FIG. 1, environment 100 can include autonomous vehicle 10, one or more networks 106, and computing system 108.

Autonomous vehicle 10 can be capable of sensing its environment, navigating its environment with minimal or no human input, and/or the like. Autonomous vehicle 10 can be a ground-based autonomous vehicle (e.g., car, truck, bus, and/or the like), an air-based autonomous vehicle (e.g., airplane, drone, helicopter, and/or the like), and/or other type of vehicle (e.g., watercraft, and/or the like). Autonomous vehicle 10 can include one or more sensors 124, computing system 102, and one or more vehicle controls 126. Computing system 102 can assist in controlling autonomous vehicle 10. For example, computing system 102 can receive data generated by sensor(s) 124, attempt to comprehend an environment surrounding autonomous vehicle 10 by performing various processing techniques on the data generated by sensor(s) 124, generate, determine, select, and/or the like a motion plan for navigating autonomous vehicle 10 through, within, and/or the like such surrounding environment, and/or the like. Computing system 102 can interface with vehicle control(s) 126 to operate autonomous vehicle 10 (e.g., in accordance with the motion plan, and/or the like).

Computing system 102 can include one or more computing devices 104. Computing device(s) 104 can include circuitry configured to perform one or more operations, functions, and/or the like described herein. For example, computing device(s) 104 can include one or more processor(s) 112, one or more communication interfaces 114, and memory 116 (e.g., one or more hardware components for storing executable instructions, data, and/or the like). Communication interface(s) 114 can enable computing device(s) 104 to communicate with one another, and/or can enable autonomous vehicle 10 (e.g., computing system 102, computing device(s) 104, and/or the like) to communicate with one or more computing systems, computing devices, and/or the like distinct from autonomous vehicle 10 (e.g., computing system 108, and/or the like). Memory 116 can include (e.g., store, and/or the like) instructions 118 and data 120. When executed by processor(s) 112, instructions 118 can cause autonomous vehicle 10 (e.g., computing system 102, computing device(s) 104, and/or the like) to perform one or more operations, functions, and/or the like described herein. Data 120 can include, represent, and/or the like information associated with such operations, functions, and/or the like, data generated by sensor(s) 124, and/or the like.

Computing system 102 can be physically located onboard autonomous vehicle 10, and computing system 108 can be distinct and/or remotely located from autonomous vehicle 10. Network(s) 106 (e.g., wired networks, wireless networks, and/or the like) can interface autonomous vehicle 10 (e.g., computing system 102, computing device(s) 104, and/or the like) with computing system 108, which can include one or more computing devices analogous to computing device(s) 104, one or more components (e.g., memory, processors, communication interfaces, and/or the like) analogous to those of computing device(s) 104, and/or the like. Irrespective of attribution described or implied herein, unless explicitly indicated otherwise, the operations, functions, and/or the like described herein can be performed by computing system(s) 102 and/or 108 (e.g., by computing system 102, by computing system 108, by a combination of computing systems 102 and 108, and/or the like).

Computing system 102 can include positioning system 110, which can include one or more devices, circuitry, and/or the like for analyzing, approximating, determining, and/or the like one or more geographic positions of autonomous vehicle 10. For example, positioning system 110 can analyze, approximate, determine, and/or the like such position(s) using one or more inertial sensors, triangulations and/or proximities to network components (e.g., cellular towers, WiFi access points, and/or the like), satellite positioning systems, network addresses, and/or the like. Computing system 102 can include perception system 128, prediction system 130, and motion-planning system 132, which can cooperate to perceive a dynamic environment surrounding autonomous vehicle 10, generate, determine, select, and/or the like a motion plan for autonomous vehicle 10, and/or the like.

Perception system 128 can receive data from sensor(s) 124, which can be coupled to or otherwise included within autonomous vehicle 10. Sensor(s) 124 can include, for example, one or more cameras (e.g., visible spectrum cameras, infrared cameras, and/or the like), light detection and ranging (LIDAR) systems, radio detection and ranging (RADAR) systems, and/or the like. Sensor(s) 124 can generate data including information that describes one or more locations, velocities, vectors, and/or the like of objects in the environment surrounding autonomous vehicle 10. For example, a LIDAR system can generate data indicating the relative location (e.g., in three-dimensional space relative to the LIDAR system, and/or the like) of a number of points corresponding to objects that have reflected a ranging laser of the LIDAR system. Such a LIDAR system can, for example, measure distances by measuring the interference between outgoing and incoming light waves, measuring the time of flight (TOF) it takes a short laser pulse to travel from a sensor to an object and back, calculating the distance based at least in part on the TOF with respect to the known speed of light, based at least in part on a phase-shift with known wavelength, and/or the like. As another example, a RADAR system can generate data indicating one or more relative locations (e.g., in three-dimensional space relative to the RADAR system, and/or the like) of a number of points corresponding to objects that have reflected a ranging radio wave of the RADAR system. For example, radio waves (e.g., pulsed, continuous, and/or the like) transmitted by such a RADAR system can reflect off an object and return to a receiver of the RADAR system, generating data from which information about the object's location, speed, and/or the like can be determined. As another example, for one or more cameras, various processing techniques, for example, range-imaging techniques (e.g., structure from motion, structured light, stereo triangulation, and/or the like) can be performed to identify one or more locations (e.g., in three-dimensional space relative to the camera(s), and/or the like) of a number of points corresponding to objects depicted in imagery captured by the camera(s).

Perception system 128 can retrieve, obtain, and/or the like map data 122, which can provide information about an environment surrounding autonomous vehicle 10. For example, map data 122 can provide information regarding: the identity and location of different travelways (e.g., roadways, and/or the like), road segments, buildings, other static items or objects (e.g., lampposts, crosswalks, curbing, and/or the like); the location and directions of traffic lanes (e.g., the location and/or direction of a parking lane, turning lane, bicycle lane, and/or the like); traffic-control data (e.g., the location and/or instructions of signage, traffic lights, other traffic-control devices, and/or the like); other map data providing information that can assist computing system 102 in comprehending, perceiving, and/or the like an environment surrounding autonomous vehicle 10, its relationship thereto, and/or the like.

Perception system 128 can (e.g., based at least in part on data received from sensor(s) 124, map data 122, and/or the like) identify one or more objects proximate to autonomous vehicle 10 and determine, for each of such object(s), state data describing a current state of the object, for example, an estimate of the object's: size/footprint (e.g., as represented by a bounding shape such as a polygon, polyhedron, and/or the like); class (e.g., vehicle, pedestrian, bicycle, and/or the like); current location (also referred to as position), speed (also referred to as velocity), acceleration, heading, orientation, yaw rate; and/or the like. In some embodiments, perception system 128 can determine such state data for each object over a number of iterations, for example, updating, as part of each iteration, the state data for each object. Accordingly, perception system 128 can detect, track, and/or the like such object(s) over time.

Prediction system 130 can receive state data from perception system 128 and can predict (e.g., based at least in part on such state data, and/or the like) one or more future locations for each object. For example, prediction system 130 can predict where each object will be located within the next five seconds, ten seconds, twenty seconds, and/or the like. As one example, an object can be predicted to adhere to its current trajectory according to its current speed. Additionally or alternatively, other prediction techniques, modeling, and/or the like can be used.

Motion-planning system 132 can generate, determine, select, and/or the like a motion plan for autonomous vehicle 10, for example, based at least in part on state data of object(s) provided by perception system 128, predicted future location(s) of object(s) provided by prediction system 130, and/or the like. For example, utilizing information about current location(s) of object(s), predicted future location(s) of object(s), and/or the like, motion-planning system 132 can generate, determine, select, and/or the like a motion plan for autonomous vehicle 10 that it determines (e.g., based at least in part on one or more operation parameters, and/or the like) best navigates autonomous vehicle 10 relative to the object(s). Motion-planning system 132 can provide the motion plan to vehicle-control system 134, which can directly and/or indirectly control autonomous vehicle 10 via vehicle control(s) 126 (e.g., one or more actuators, devices, and/or the like that control gas, power flow, steering, braking, and/or the like) in accordance with the motion plan.

Perception system 128, prediction system 130, motion-planning system 132, and/or vehicle-control system 134 can include logic utilized to provide functionality described herein. Perception system 128, prediction system 130, motion-planning system 132, and/or vehicle-control system 134 can be implemented in hardware (e.g., circuitry, and/or the like), firmware, software configured to control one or more processors, one or more combinations thereof, and/or the like. For example, instructions 118, when executed by processor(s) 112, can cause autonomous vehicle 10 (e.g., computing system 102, computing device(s) 104, and/or the like) to implement functionality of perception system 128, prediction system 130, motion-planning system 132, and/or vehicle-control system 134 described herein.

FIGS. 2-6 depict example autonomous-vehicle-interior arrangements according to example embodiments of the present disclosure.

Figure 2:
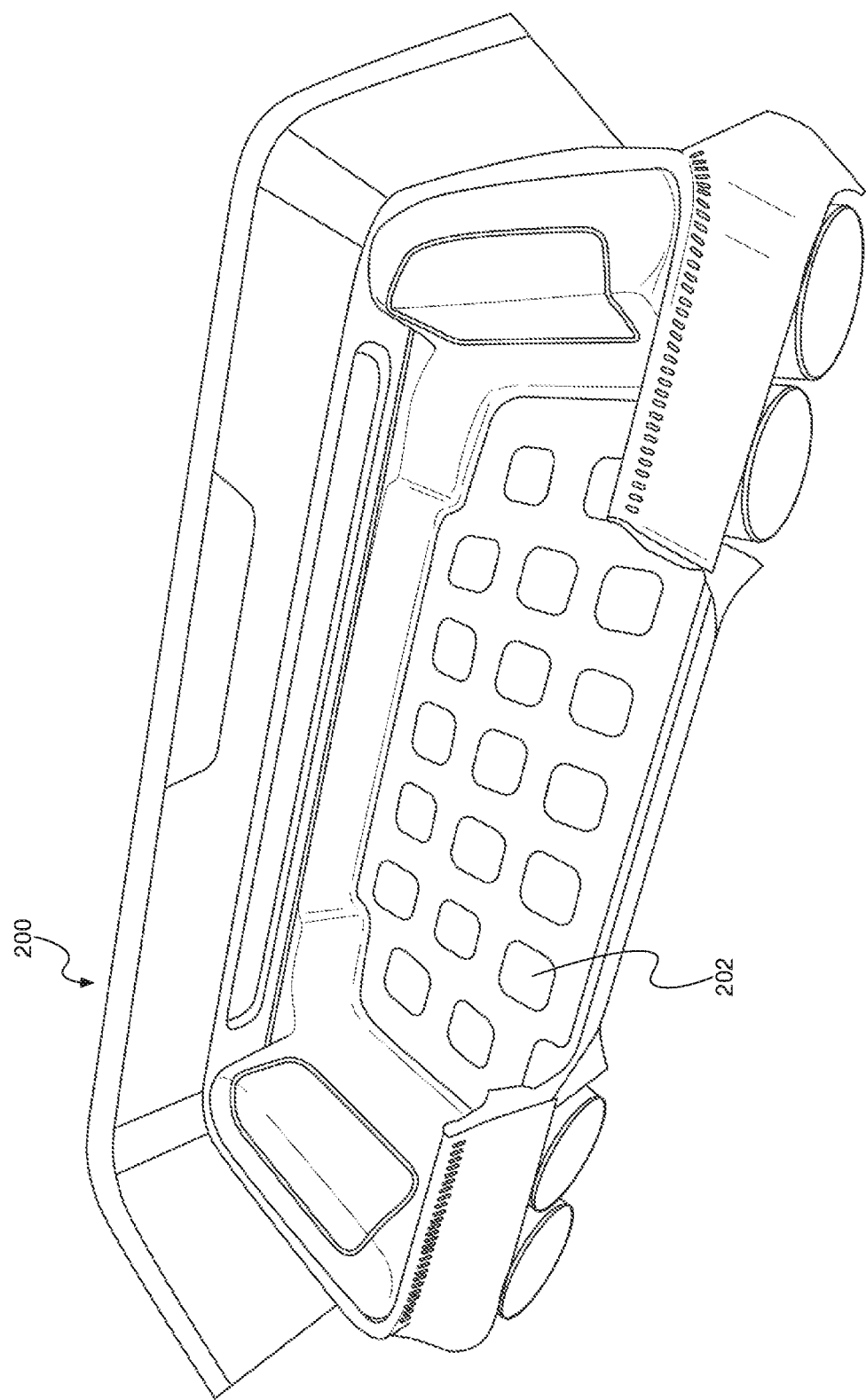
FIGS. 2-6 depict example autonomous-vehicle-interior arrangements according to example embodiments of the present disclosure.
Figure 3:
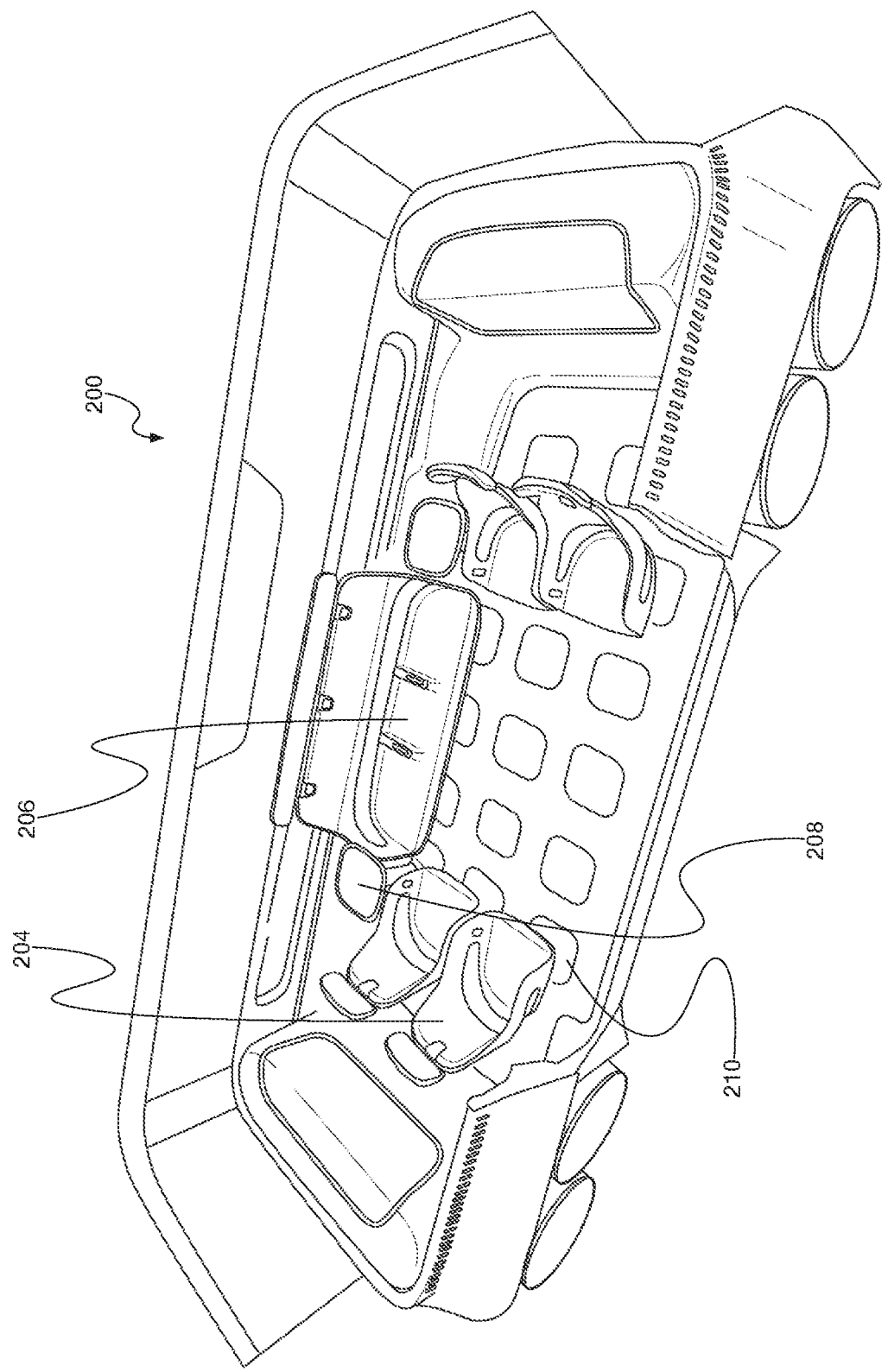
Figure 4:
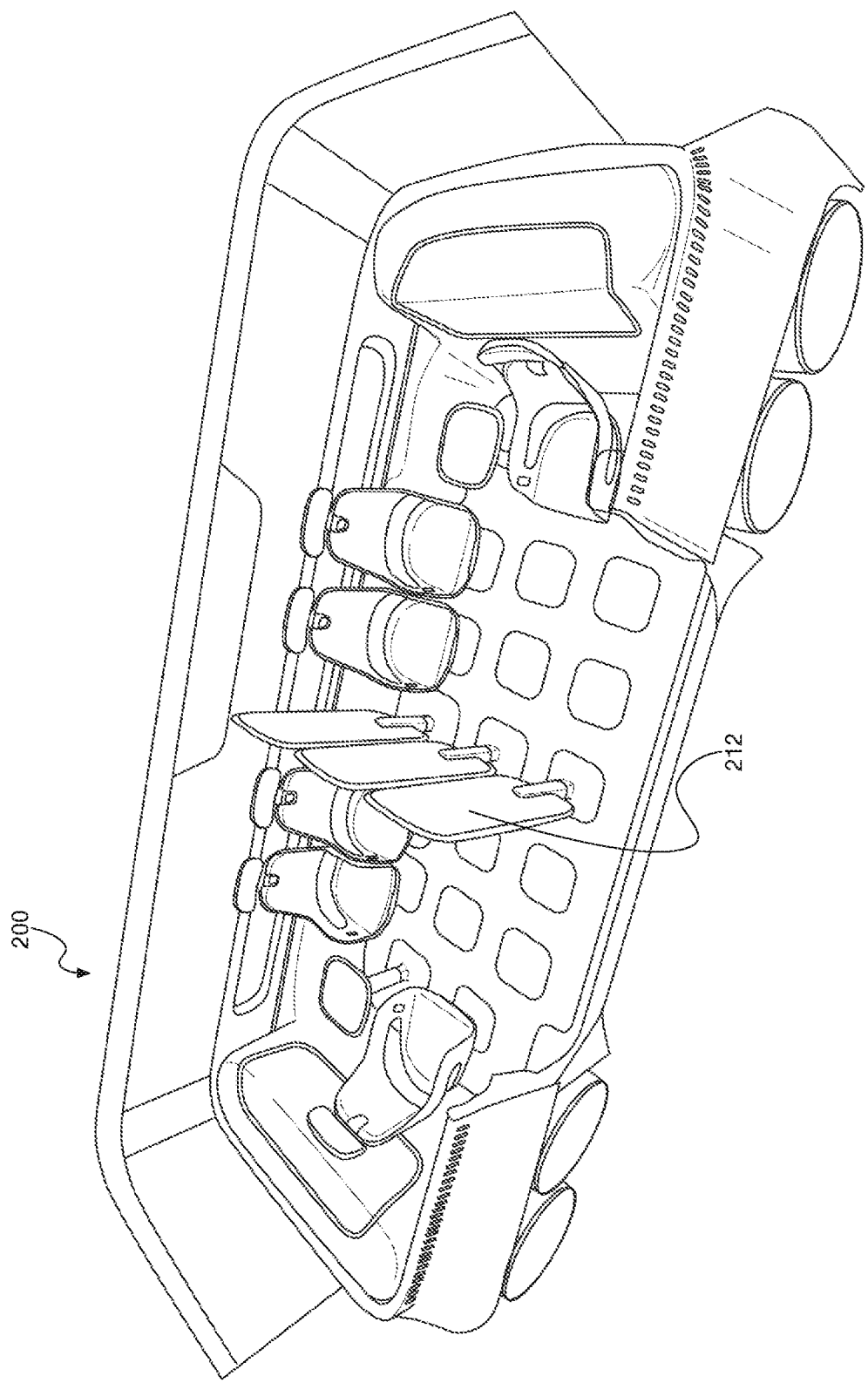
Figure 5:
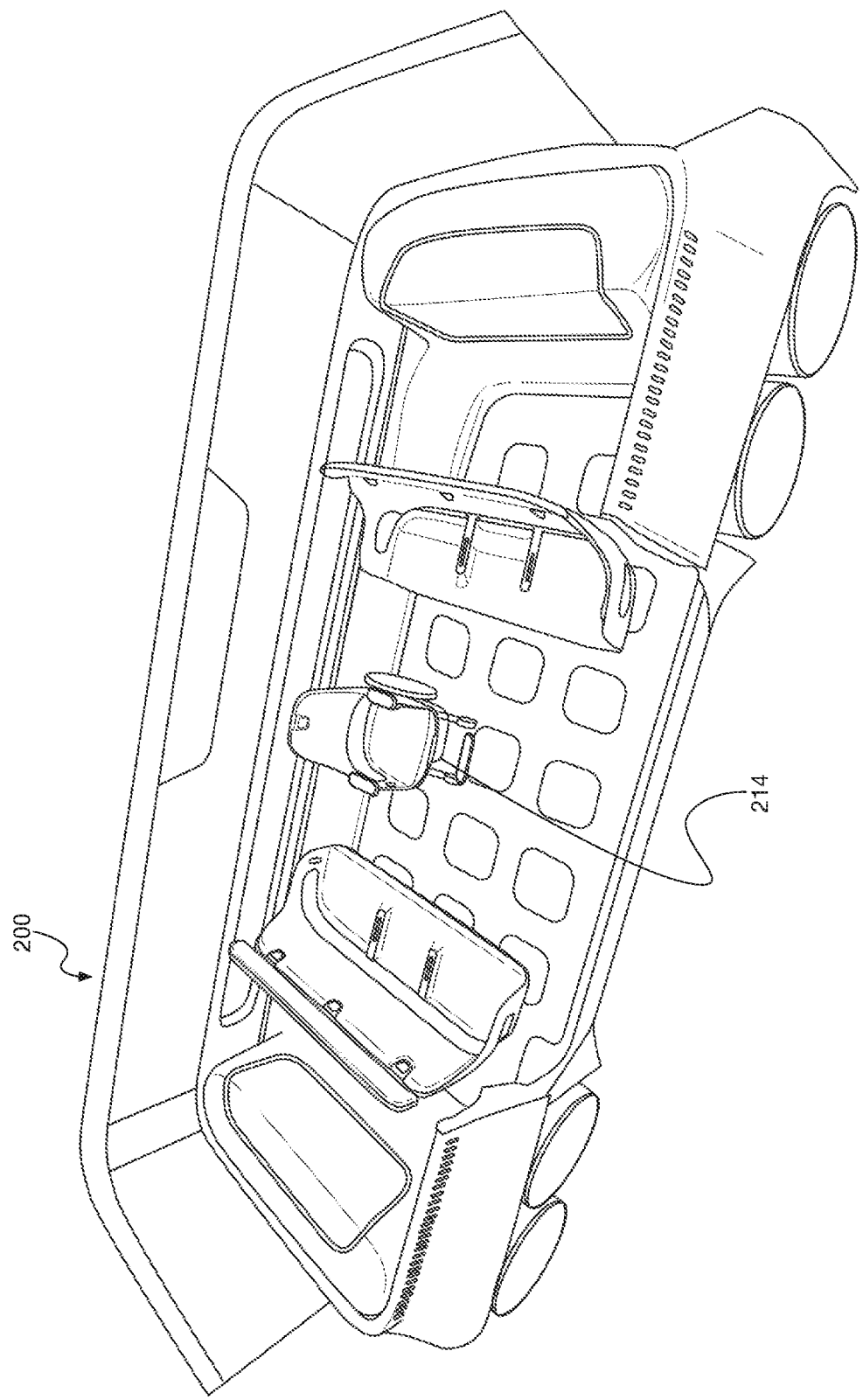
Figure 6:
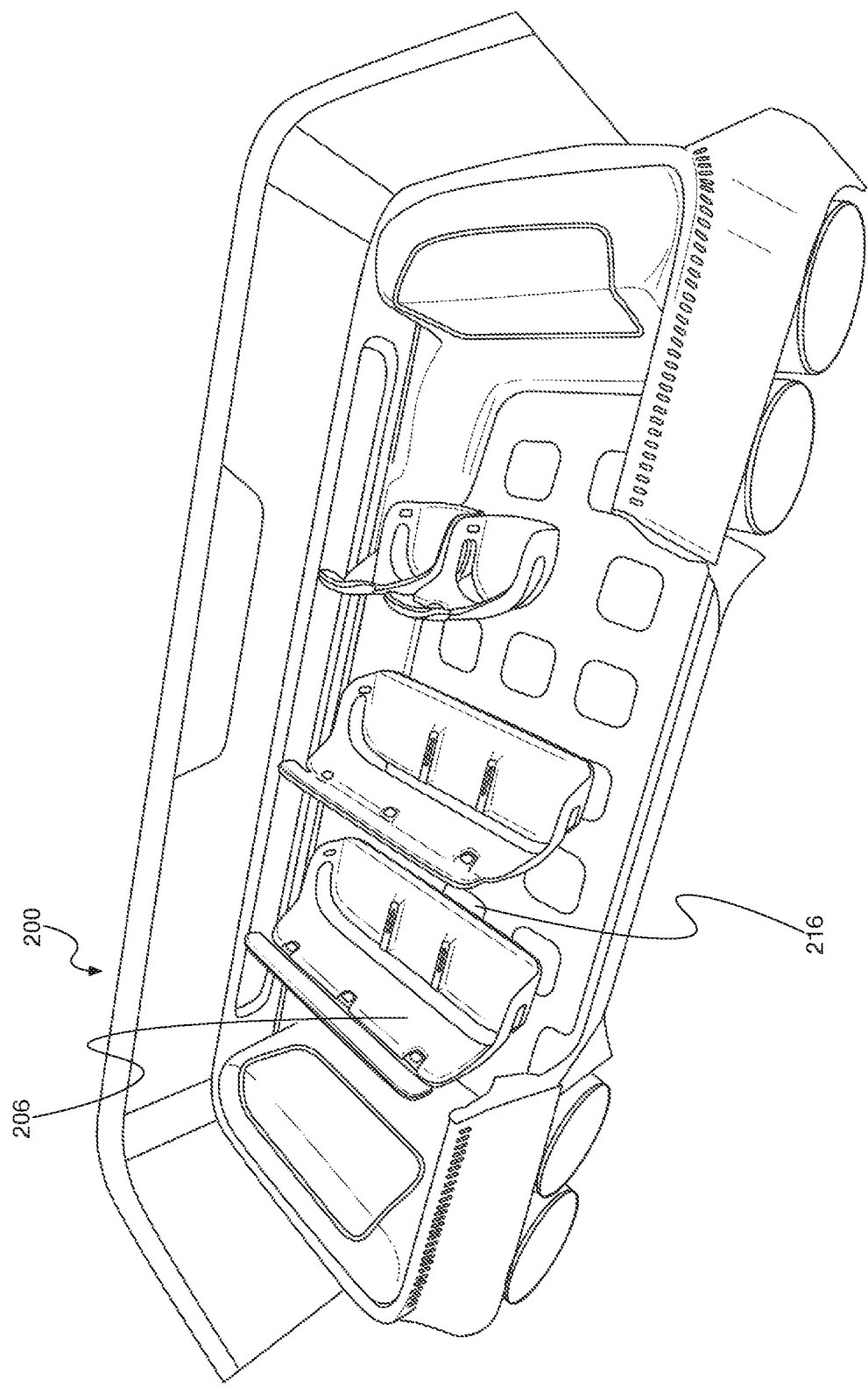

Referring to FIG. 2, interior 200 can be an interior of an autonomous vehicle (e.g., autonomous vehicle 10, and/or the like). In accordance with aspects of the disclosure, interior 200 can include a plurality of different and distinct regions (e.g., portions, sections, and/or the like). For example, interior 200 can include region 202 and a plurality of similar different and distinct regions, as illustrated.

In some embodiments, the regions of interior 200 can share, have, be defined in accordance with, and/or the like a common specification. For example, each of the regions of interior 200 can share common dimensions (e.g., be of the same dimensions, and/or the like) with each of the other regions of interior 200. Similarly, each of the regions of interior 200 (e.g., their largest respective interior-facing surface area, and/or the like) can be defined at least in part by a particular shape (e.g., rectangle, square, circle, oval, and/or the like) that defines at least in part each of the other regions of interior 200.

In some embodiments, each of the regions of interior 200 can be evenly spaced within the interior from its respective adjacent interior regions (e.g., in an aligned or offset grid pattern, and/or the like). As illustrated, in some embodiments, the regions of interior 200 can be arranged in a plurality of different and distinct rows. For example, in some embodiments, such rows can be evenly spaced. In some embodiments, each of multiple of such rows can include a common number of the interior regions, for example, each of the rows can include the same number (e.g., three, and/or the like) of interior regions, and/or the like. As illustrated, in some of such embodiments, for each of such rows, the common number of the interior regions can align with the common number of the interior regions included in one or more of such rows that are adjacent to the row (e.g., in an aligned grid pattern, and/or the like).

In some embodiments, the plurality of rows can include one or more other rows. Each of such other row(s) can include a common number of the interior regions, for example, the same number (e.g., two, and/or the like) of the interior regions per row, and/or the like, which can be a different number of interior regions from the common number of the interior regions included in the previously described multiple rows. In some embodiments, each of such other row(s) can be adjacent to one or more of the previously described multiple rows. As illustrated, in some of such embodiments, for each of such other row(s), the common number of the interior regions included in the row can be offset in alignment from the common number of the interior regions included in its adjacent row(s) (e.g., in an offset grid pattern, and/or the like).

For one or more of the regions, interior 200 can include one or more modular interior units comprising an interior element. For example, referring to FIG. 3, interior 200 can include modular interior unit 204 (e.g., comprising a seat, and/or the like), modular interior unit 206 (e.g., comprising a bench seat, and/or the like), and modular interior unit 208 (e.g., comprising a table, and/or the like). Similarly, referring to FIG. 4, interior 200 can include modular interior unit 212 (e.g., comprising a privacy partition, and/or the like); and referring to FIG. 5, interior 200 can include modular interior unit 214 (e.g., comprising hardware for securing one or more wheelchairs to interior 200, and/or the like).

Figure 7:
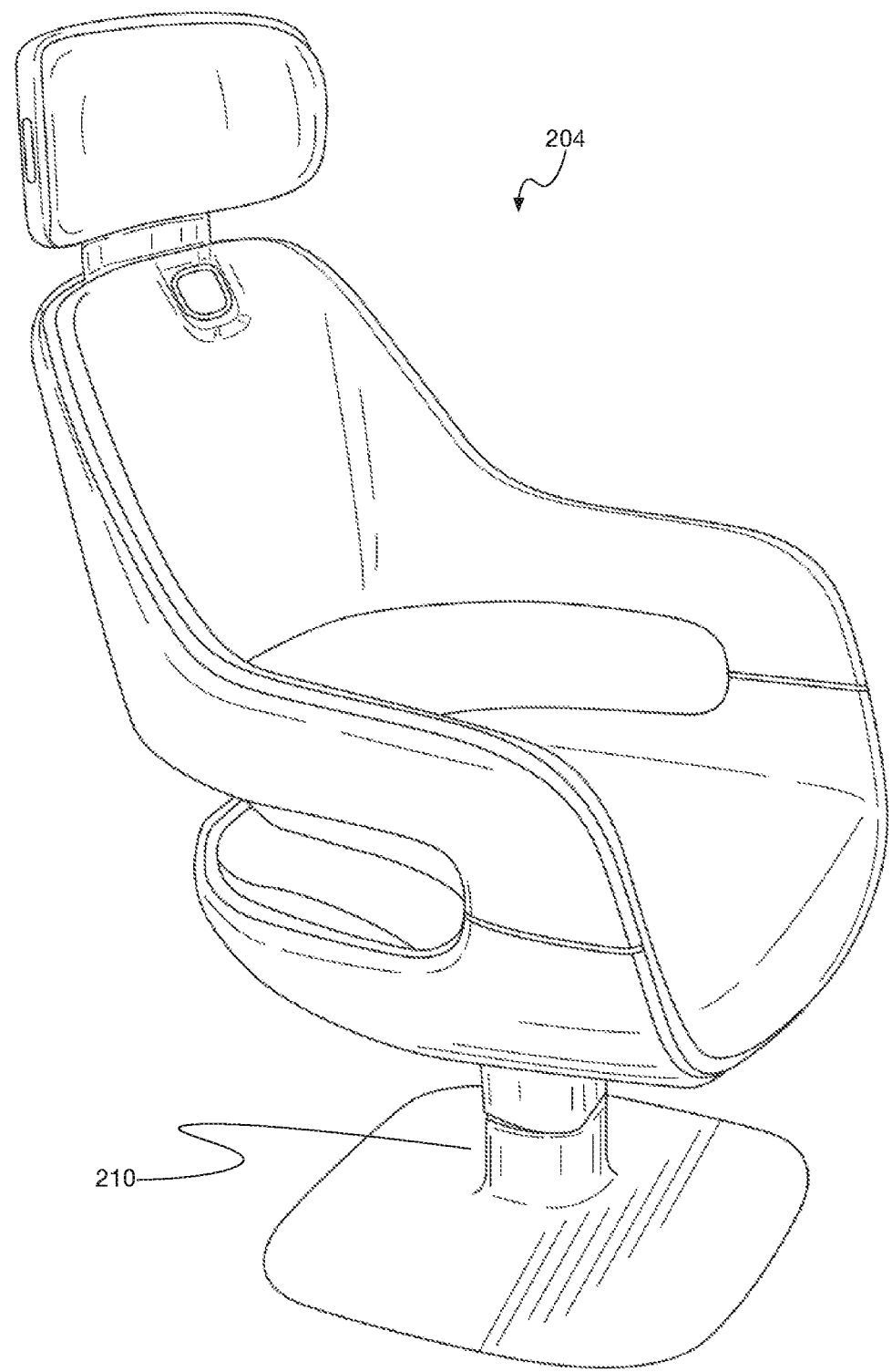
FIGS. 7-9 depict example modular autonomous-vehicle-interior units according to example embodiments of the present disclosure.
Figure 8:
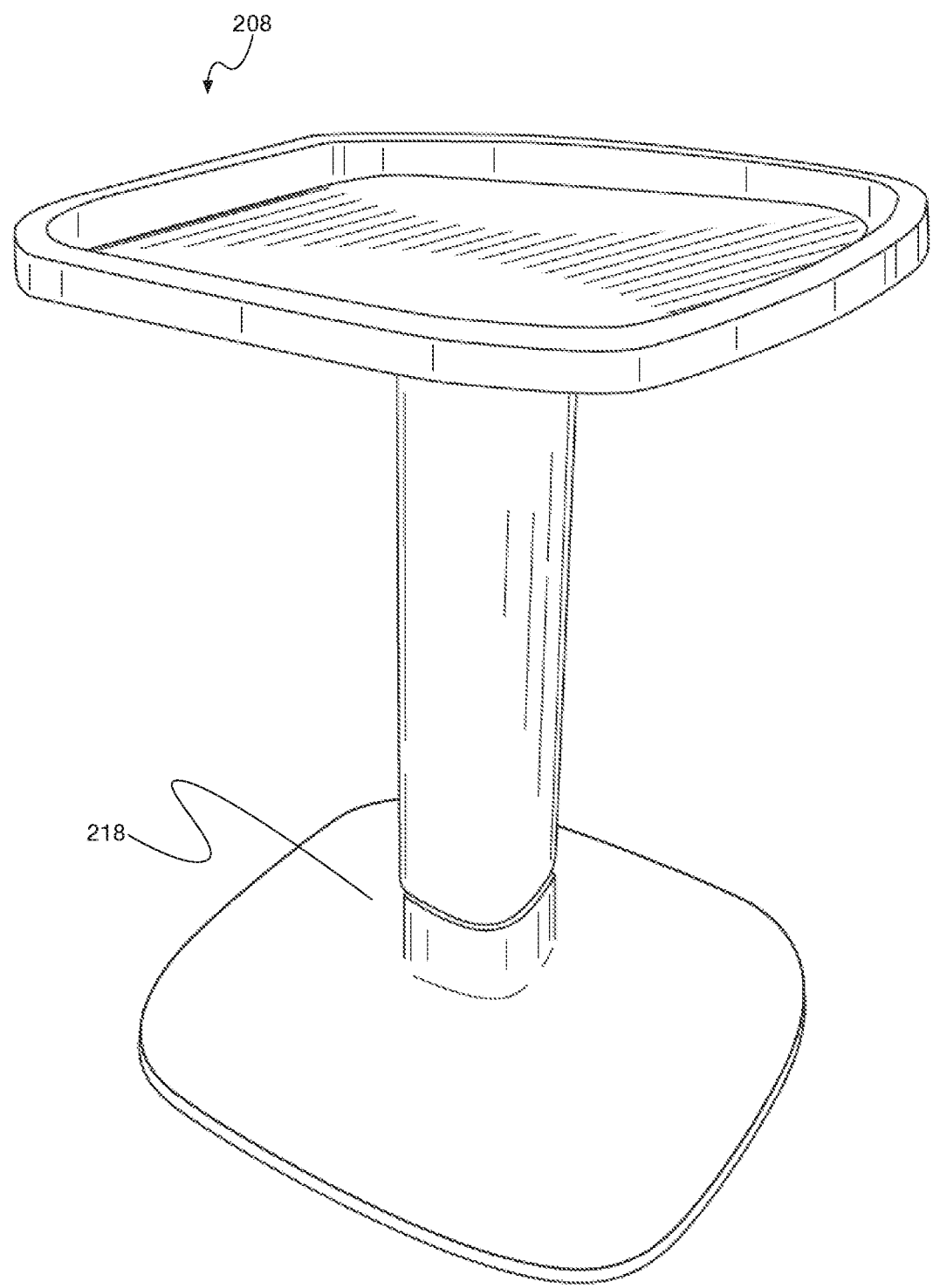
Figure 9:
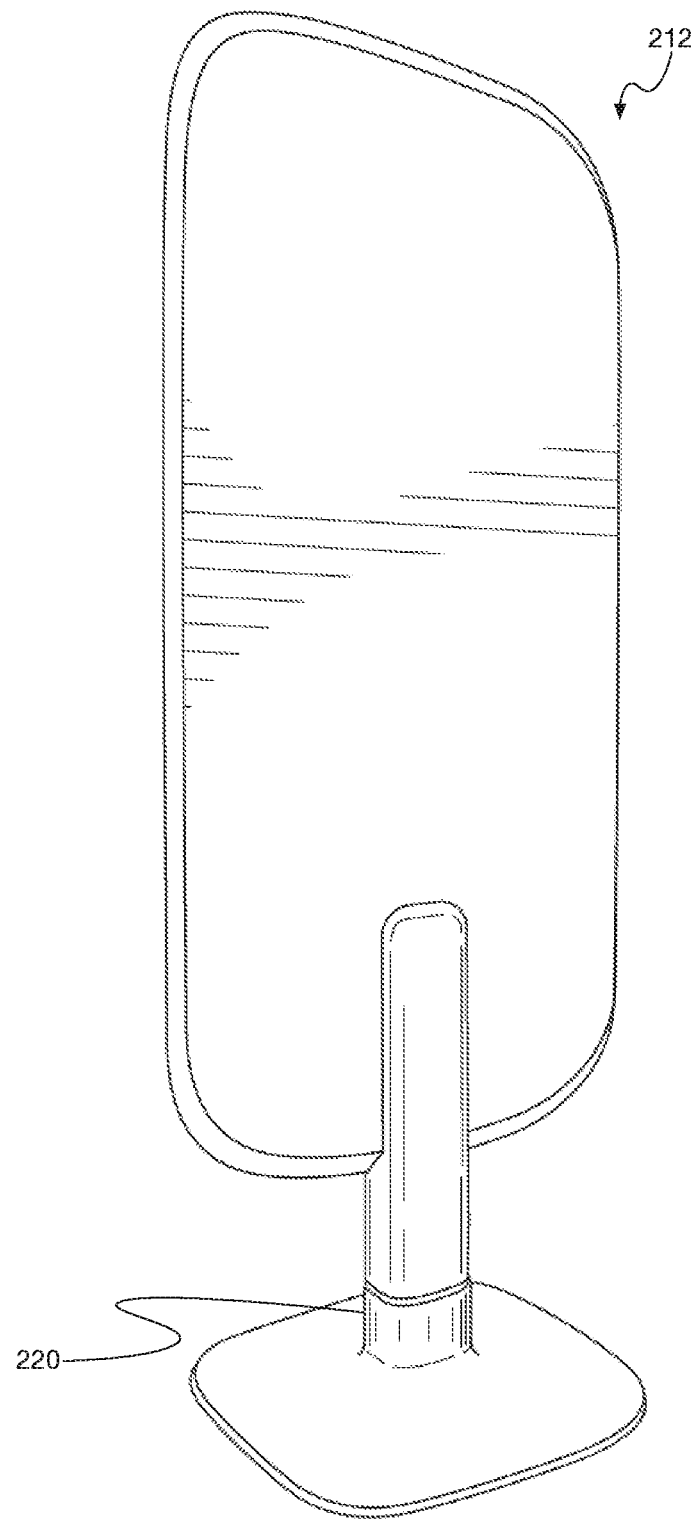

Each of the modular interior units can include one or more bases. For example, referring to FIG. 7, modular interior unit 204 can include base 210. Similarly, referring to FIG. 8, modular interior unit 208 can include base 218; and referring to FIG. 9, modular interior unit 212 can include base 220. Each base (e.g., base(s) 210, 218, 220, and/or the like) can be defined at least in part by the particular shape based at least in part by which the regions of interior 200 are defined (e.g., a surface area of each base configured to interface with an interior region can be of the same shape as an interior-facing surface area of such interior region configured to interface with the surface area of the base, and/or the like).

Each of the regions of interior 200 can include one or more mechanical interfaces associated therewith, and the base(s) (e.g., base(s) 210, 218, 220, and/or the like) can mechanically interface with the mechanical interface(s) of the interior region(s) and thereby secure the interior element(s) of the unit(s) (e.g., unit(s) 204, 208, 212, and/or the like) to interior 200, and/or the like. For example, region 202 can include one or more mechanical interfaces associated therewith, and base 210 can mechanically interface with such interface(s) and thereby secure the interior element(s) of unit 204 (e.g., the seat, and/or the like) to interior 200, and/or the like.

In some embodiments, a device comprising specialized tooling can be required to decouple a base of a unit from interior 200 (e.g., to mitigate the possibility of unauthorized removal, and/or the like). For example, the region(s) of interior 200 (e.g., one or more of their associated mechanical interface(s), and/or the like) can be configured to interface with such device. Additionally or alternatively, the unit (e.g., the base, and/or the like) can be configured to interface with such device.

In some embodiments, one or more of the modular interior units can include multiple bases. For example, referring to FIG. 6, unit 206 can include multiple bases configured to interface with multiple (e.g., at least two, and/or the like) regions of interior 200. In some of such embodiments, one or more of such unit(s) can be configured to span (e.g., extend across, and/or the like) one or more of the interior regions that are not mechanically interfaced with one or more bases of the unit(s). For example, unit 206 can be configured to span region 216.

Figure 10:
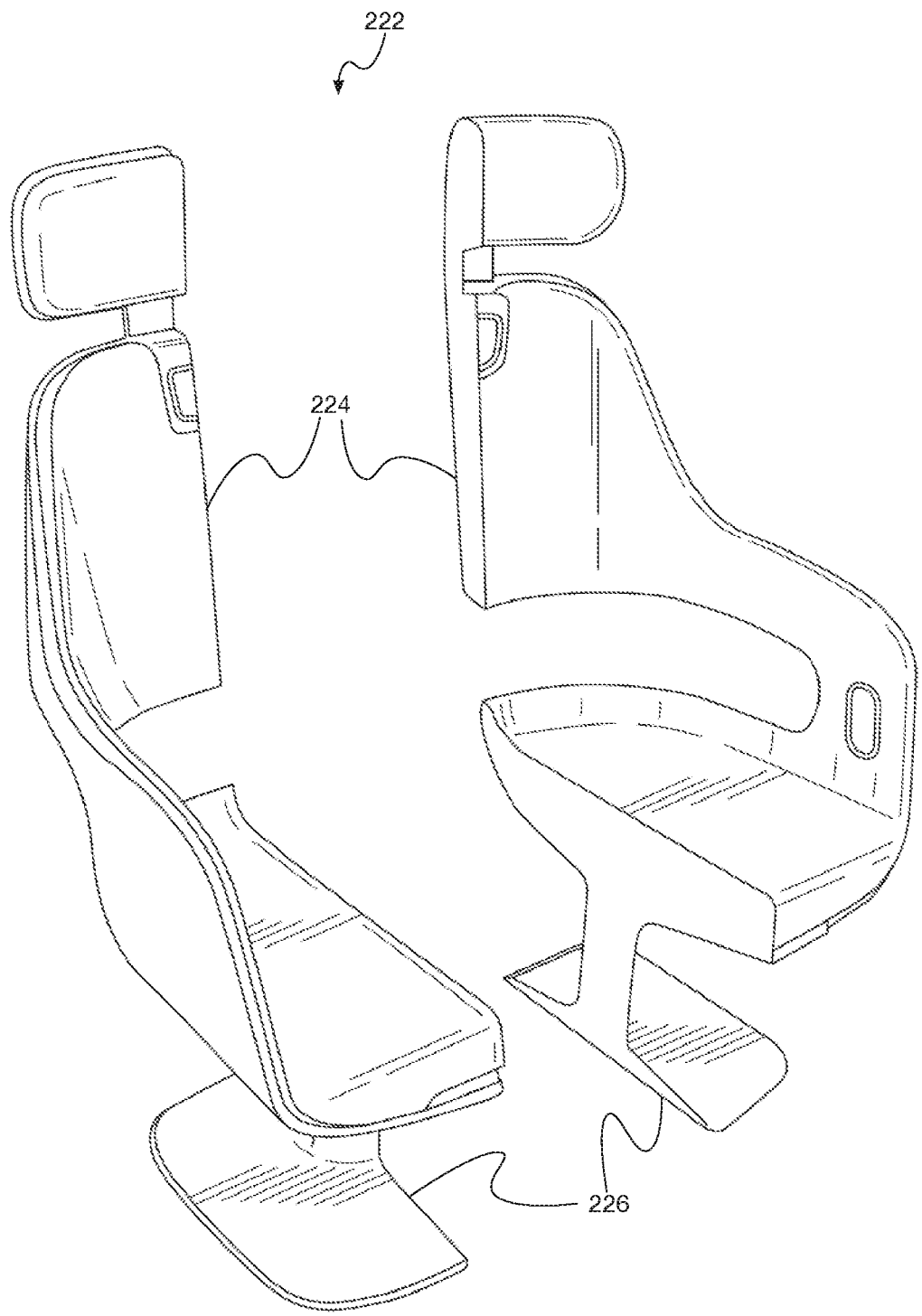
FIGS. 10-12 depict example assemblies of example modular autonomous-vehicle-interior units according to example embodiments of the present disclosure.
Figure 11:
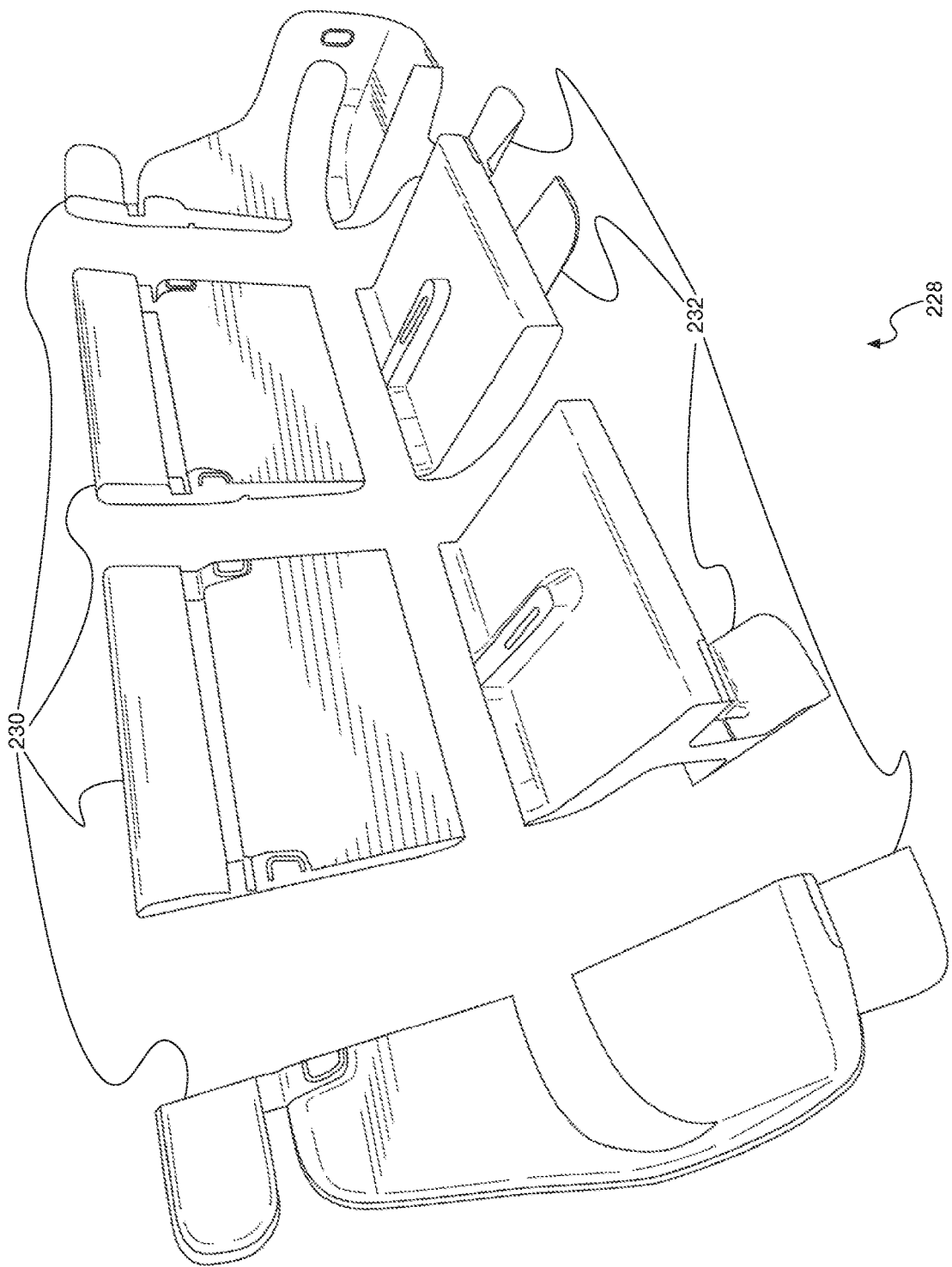
Figure 12:
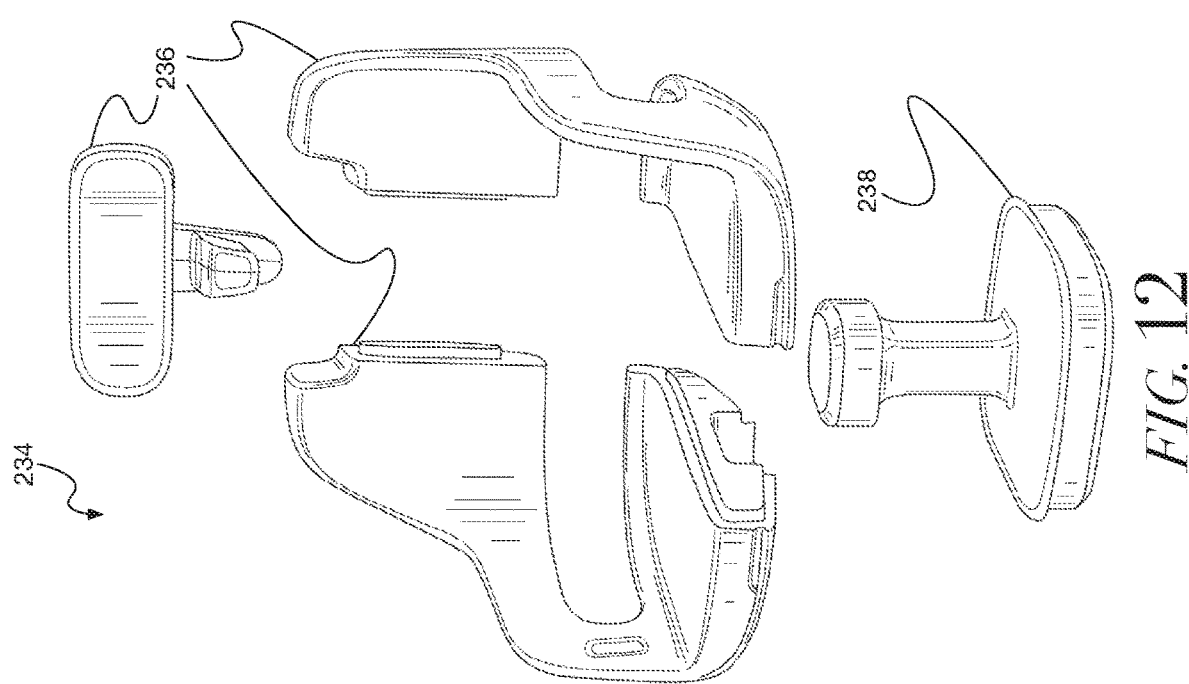

In some embodiments, one or more of the modular interior units can include one or more physically distinct portions. For example, one of such portions can include a portion of the interior element for the unit, and another of such portions can include a different and distinct portion of the interior element for the unit (e.g., such portions can be assembled with one another and/or one or more additional portions into a unit, subsequently disassembled back into different and distinct portions, and/or the like). Additionally or alternatively, one of such portions can include a portion of a base for the unit, and another of such portions can include a different and distinct portion of the base for the unit. For example, referring to FIG. 10, assembly 222 can include portions 224 (e.g., comprising portions of one or more interior elements for a unit, and/or the like) and portions 226 (e.g., comprising portions of one or more bases for a unit, and/or the like). Similarly, referring to FIG. 11, assembly 228 can include portions 230 (e.g., comprising portions of one or more interior elements for a unit, and/or the like) and portions 232 (e.g., comprising portions of one or more bases for a unit, and/or the like); and referring to FIG. 12, assembly 234 can include portions 236 (e.g., comprising portions of one or more interior elements for a unit, and/or the like) and portion 238 (e.g., comprising a base for a unit, and/or the like).

Figure 13:
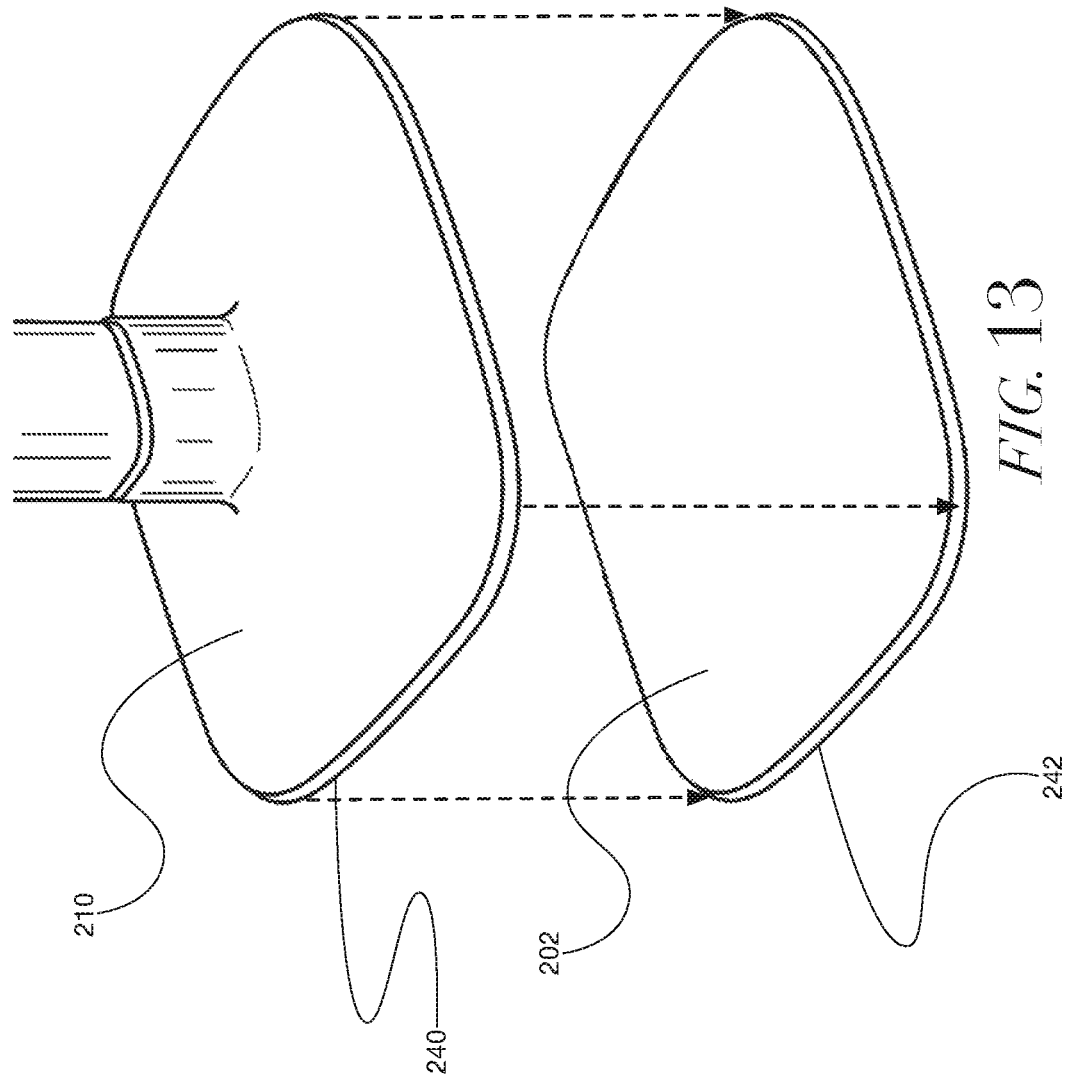
FIG. 13 depicts an example of an example base of an example modular autonomous-vehicle-interior unit and an example of an example region of an example autonomous-vehicle interior according to example embodiments of the present disclosure.

As previously indicated, for each of the region(s) of interior 200 for which interior 200 includes modular interior unit(s), a base of a unit can mechanically interface with interior 200 via the mechanical interface(s) associated with the interior region. In some embodiments, such interfacing can be in response to a perimeter of the base engaging a perimeter of the interior region (e.g., a base and interior region of the same shape being aligned, brought into contact with one another, and/or the like). For example, referring to FIG. 13, base 210 can mechanically interface with region 202 in response to perimeter 240 of base 210 engaging perimeter 242 of region 202. For example, interior 200 can be configured such that an interior-facing surface area of region 202 (e.g., within perimeter 242, and/or the like) is fixed flush with a surface of interior 200 (e.g., the floorboard, and/or the like) until a base (e.g., base 210, and/or the like) of a unit is brought into alignment, contact, and/or the like with perimeter 242, for example, thereby enabling region 202 to serve as an interior surface when not interfaced with a base of a unit (e.g., support the weight of a standing passenger when interior 200 is configured such that region 202 does not include a unit, and/or the like), but also adjust to accommodate the base of a unit such that it can mechanically interface with interior 200 (e.g., when interior 200 is configured such that region 202 includes such unit, and/or the like).

Aspects of the disclosure have been described in terms of illustrative embodiments thereof. Numerous other embodiments, modifications, and/or variations within the scope and spirit of the appended claims can occur to persons of ordinary skill in the art from a review of this disclosure. Any and all features in the following claims can be combined and/or rearranged in any way possible.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and/or equivalents to such embodiments. Accordingly, the subject disclosure does not preclude inclusion of such modifications, variations, and/or additions to the present subject matter as would be readily apparent to one of ordinary skill in the art. For instance, features illustrated and/or described as part of one embodiment can be used with another embodiment to yield a still further embodiment. Thus, it is intended that the present disclosure cover such alterations, variations, and/or equivalents.

What is claimed is:

1. An autonomous vehicle comprising:
an interior comprising a plurality of different and distinct regions comprising one or more mechanical interfaces associated therewith; and
for one or more regions of the plurality of different and distinct regions, at least one modular interior unit comprising an interior element and a base mechanically interfaced with the one or more mechanical interfaces associated with the one or more regions, wherein the at least one modular interior unit comprises:
a first portion of the at least one modular interior unit comprising a first portion of the base; and
a second portion of the at least one modular interior unit comprising a second portion of the base;
wherein the first portion of the at least one modular interior unit and the second portion of the at least one modular interior unit together form a perimeter of the base mechanically interfaced with the one or more mechanical interfaces.

2. The autonomous vehicle of claim 1, wherein, for at least one region of the one or more regions, the interior element comprises a seat.

3. The autonomous vehicle of claim 1, wherein, for at least one region of the one or more regions, the interior element comprises a table.

4. The autonomous vehicle of claim 1, wherein, for at least one region of the one or more regions, the interior element comprises a privacy partition.

5. The autonomous vehicle of claim 1, wherein, for at least one region of the one or more regions, the interior element comprises hardware for securing a wheelchair to the interior.

6. The autonomous vehicle of claim 1, wherein at least one region of the plurality of different and distinct regions shares common dimensions with at least ones other region of the plurality of different and distinct regions.

7. The autonomous vehicle of claim 1, wherein a plurality of regions of the plurality of different and distinct regions are defined at least in part by a particular shape.

8. The autonomous vehicle of claim 7, wherein, for the one or more regions, the base is defined at least in part by the particular shape.

9. The autonomous vehicle of claim 1, wherein a plurality of regions of the plurality of different and distinct regions are evenly spaced within the interior from adjacent regions of the plurality of different and distinct regions.

10. The autonomous vehicle of claim 1, wherein:
the interior comprises a plurality of different and distinct evenly spaced rows; and
at least one row of the plurality of different and distinct evenly spaced rows includes a common number of the plurality of different and distinct regions as at least one other row of the plurality of different and distinct evenly spaced rows.

11. The autonomous vehicle of claim 10, wherein, for the at least one row of the plurality of different and distinct evenly spaced rows, the common number of the plurality of different and distinct regions included in the at least one row align with the common number of the plurality of different and distinct regions included in one or more rows of the plurality of different and distinct evenly spaced rows adjacent to the at least one row.

12. The autonomous vehicle of claim 10, wherein:
the interior comprises one or more additional different and distinct rows;
at least one row of the one or more additional different and distinct rows includes a common number of the plurality of different and distinct regions as at least one other row of the one or more additional different and distinct rows; and
the common number of the plurality of different and distinct regions included in the one or more additional different and distinct rows is different from the common number of the plurality of different and distinct regions included in the plurality of different and distinct evenly spaced rows.

13. The autonomous vehicle of claim 12, wherein, for the at least one row of the one or more additional different and distinct rows:
the at least one row is adjacent to at least one of the plurality of different and distinct evenly spaced rows; and
the common number of the plurality of different and distinct regions included in the at least one row are offset in alignment from the common number of the plurality of different and distinct regions included in the at least one of the plurality of different and distinct evenly spaced rows.

14. The autonomous vehicle of claim 1, wherein, for the one or more regions, the base mechanically interfaces via the one or more mechanical interfaces associated with the one or more regions in response to a perimeter of the base engaging a perimeter of the one or more regions.

15. The autonomous vehicle of claim 1, wherein, for the one or more regions, the one or more mechanical interfaces associated with the one or more regions are configured to interface with a device comprising tooling for decoupling the base from the interior.

16. The autonomous vehicle of claim 1, wherein:
for at least two regions of the one or more regions, the at least one modular interior unit comprises:
a modular interior unit common to the at least two regions, and
at least two bases;
a first of the at least two bases mechanically interfaces with the interior via one or more mechanical interfaces associated with a first of the at least two regions; and
a second of the at least two bases mechanically interfaces with the interior via one or more mechanical interfaces associated with a second of the at least two regions.

17. The autonomous vehicle of claim 16, wherein at least a portion of the modular interior unit common to the at least two regions spans at least one of the plurality of different and distinct regions that is not mechanically interfaced with a base of the modular interior unit common to the at least two regions.

18. The autonomous vehicle of claim 17, wherein the at least one of the plurality of different and distinct regions that is not mechanically interfaced with the base of the modular interior unit common to the at least two regions is evenly spaced between the first of the at least two regions and the second of the at least two regions.

19. An autonomous-vehicle interior comprising:
a plurality of evenly spaced rows comprising a common number of multiple evenly spaced different and distinct regions defined at least in part by a particular shape; and for at least one region of the multiple evenly spaced different and distinct regions, one or more mechanical interfaces configured to mechanically interface with one or more bases of one or more modular interior units, at least one base of the one or more bases being defined at least in part by the particular shape, wherein a respective modular interior unit of the one or more modular interior units comprises:
- a first portion of the respective modular interior unit comprising a first portion of a respective base of the one or more bases; and
- a second portion of the respective modular interior unit comprising a second portion of the respective base;

wherein the first portion of the respective modular interior unit and the second portion of the respective modular interior unit together form a perimeter of the respective base to mechanically interface with the one or more mechanical interfaces.

20. An autonomous-vehicle interior comprising:
a plurality of different and distinct regions defined at least in part by a particular shape; and
for at least one region of the plurality of different and distinct regions, one or more mechanical interfaces configured to mechanically interface with one or more bases of one or more modular interior units, the one or more modular interior units comprising one or more of a seat, a table, or a privacy partition, at least one base of the one or more bases being defined at least in part by the particular shape, wherein a respective modular interior unit of the one or more modular interior units comprises:
- a first portion of the respective modular interior unit comprising a first portion of a respective base of the one or more bases; and
- a second portion of the respective modular interior unit comprising a second portion of the respective base;

wherein the first portion of the respective modular interior unit and the second portion of the respective modular interior unit together form a perimeter of the respective base to mechanically interface with the one or more mechanical interfaces.

* * * * *